April 7, 1959 E. D. SEDERGREN 2,880,823
BRAKE MECHANISM
Filed Nov. 14, 1955 2 Sheets-Sheet 2
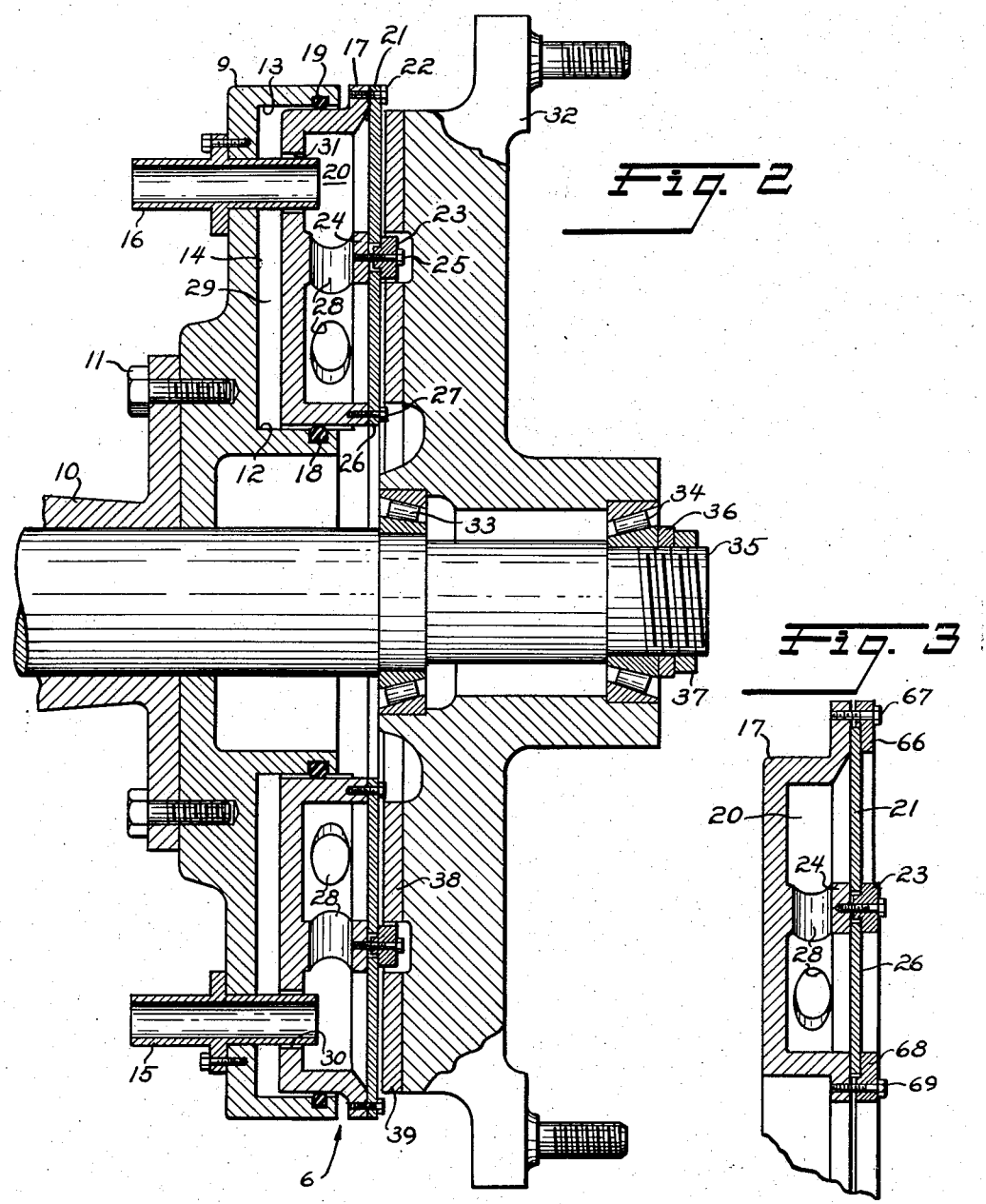
INVENTOR
ERLING D. SEDERGREN
BY Scrivener & Parker
ATTORNEYS

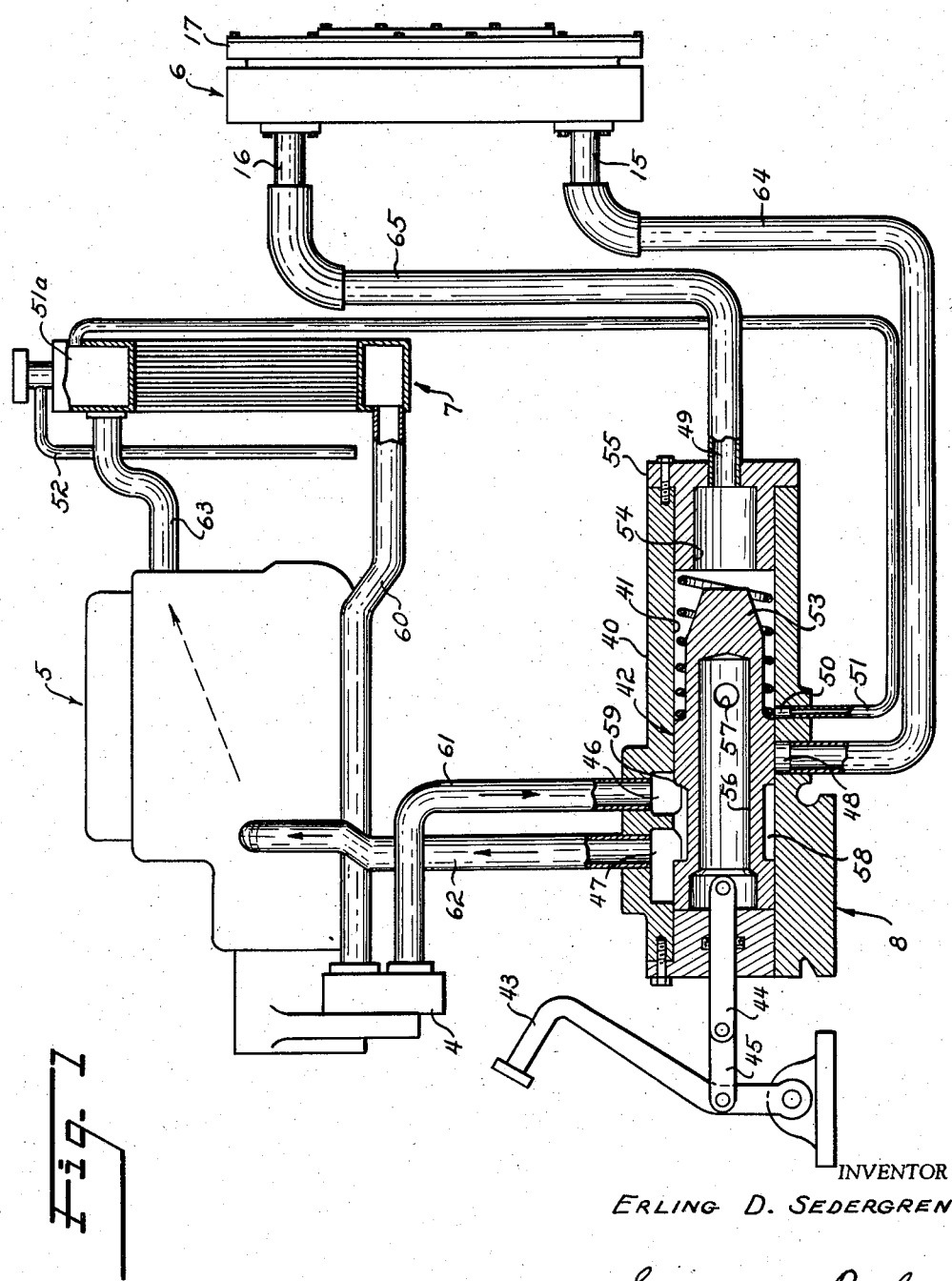

United States Patent Office 2,880,823
Patented Apr. 7, 1959

2,880,823

BRAKE MECHANISM

Erling D. Sedergren, North Woodbury, Conn., assignor to Roy S. Sanford, Woodbury, Roger H. Casler and James O. Eames, Washington, and Wilfred A. Eaton and Erling D. Sedergren, Woodbury, Conn.

Application November 14, 1955, Serial No. 546,551

11 Claims. (Cl. 188—72)

This invention relates to brake mechanism, and more particularly to brake mechanism wherein the friction elements are cooled by a liquid and the brake is operated by the pressure of the cooling liquid.

One of the objects of the invention is the provision of a novel brake mechanism so constituted as to be cooled by a circulating liquid.

Another object of the invention is to provide, in brake mechanism of the above type, means for minimizing the effects of thermal expansion in the brake friction elements.

Still another object of the invention is to provide brake mechanism of the above type having a plurality of adjacent friction elements, together with novel means for adequately cooling the elements.

These and other objects of the invention will be more readily understood when taken in connection with the accompanying drawings and the following description. It is to be expressly understood, however, that these are not to be considered as limiting the invention, reference being had to the appended claims for this purpose.

In the drawings, wherein similar reference characters are used for similar parts throughout the several views;

Fig. 1 is a diagrammatic representation, partially in section, of a brake system using the brake mechanism of the present invention;

Fig. 2 is a sectional view of a brake mechanism embodying the principles of the present invention, and Fig. 3 is a partial sectional view showing a modification of the mechanism of Fig. 2.

Referring to the drawings, the brake system includes in general a circulating pump 4 for circulating cooling liquid through the brake, an engine 5, a brake actuator 6, and engine cooling radiator 7, and a brake control valve 8.

Referring to Fig. 2 of the drawing, the brake actuator includes an annular cylinder 9 secured against rotation to an axle housing 10 by means of bolts 11. The annular cylinder has inner and outer walls 12 and 13 concentric with the axis of the axle housing, the cylinder being open at the right end and closed at the left end by a wall 14 integral with the cylinder walls. Inlet and outlet conduits 15 and 16 are secured to the wall 14 and extend therethrough and into the interior of the cylinder as shown. A rigid annular piston 17, which may be made of suitable material such as cast iron, steel, plastic, or the like, is mounted in the cylinder for sliding movement axially thereof on a resilient sealing ring 18 positioned in a groove as shown in the inner cylinder wall and a resilient sealing ring 19 positioned in a corresponding groove in the outer cylinder wall, the rings being compressed between the bottoms of the grooves and the corresponding piston walls in sliding frictional engagement with the latter, and being of flexible, resilient, rubbery material formed of a natural or synthetic rubber composition.

The piston 17 has an open ended annular channel or chamber 20 for the circulation of cooling liquid, and a portion of the channel is closed at the right end by a separate, relatively thin, flat and flexible friction plate 21, which is preferably made of a metal having a high heat conductivity, such as copper, and which is secured to the end of the rigid piston in sealing engagement therewith as by means of cap screws 22, and a clamping ring 23 secured to an annular partition 24 of the piston by means of cap screws 25. A second concentric metallic annular friction element 26, also preferably of copper, is secured to the open end of the piston in sealing engagement therewith by means of the clamping ring 23 as well as cap screws 27 along its inner periphery. The annular partition 24, which may be an integral part of the piston and is concentric with the inner and outer cylinder walls 12 and 13 and spaced therefrom, as shown, is provided with ports 28 extending therethrough for purposes to be described more fully hereinafter. The right hand surface of the annular partition 24 is flush with the face of the inner and outer peripheral portions of the right end of the piston, and serves to support the outer peripheral portion of the metal friction element 26 and the inner peripheral portion of the metal friction element 21. The clamping ring 23 is of T cross section as shown, and when clamped in place against the peripheral portions of the rings 21 and 26, the left end of the clamping ring 23 is spaced slightly from the right hand face of the annular partition 24 in order that the annular metal friction elements may be securely clamped against the end of the piston. The torque of the elements is taken by the screws 22 and 27.

As shown on the drawing, an annular channel 29 is formed between the rear wall of the piston and the cylinder wall 14, and this channel is connected with channel 20 in the piston by means of ports 30 and 31 in the left hand wall of the piston. The inlet and outlet conduits 15 and 16 extend through these ports respectively, and it will be noted that the ports are slightly larger than the outside diameters of the conduits in order to permit communication between the chambers 20 and 29. Thus when liquid is supplied to the actuator through the conduit 15, it is circulated through the annular piston chamber 20 and discharged from the actuator through the outlet conduit 16, while at the same time, the pressure in the annular piston chamber 20 is transmitted to the chamber 29 behind the piston through these ports in order that the pressure of the liquid may be effective to act on the piston to move it to the right to effect a brake application.

A wheel 32, of conventional construction, is mounted by bearings 33 and 34 on an axle shaft 35 carried by the axle housing 10, the wheel being held in place by means of a washer 36 and a nut 37. The left face of the wheel is provided with inner and outer annular friction rings 38 and 39, which may be adhesively or otherwise secured thereto, the rings being concentric with each other and with the axis of the wheel, and being in line with the unsupported areas of the friction elements 26 and 21 as shown.

From the foregoing, it will be apparent that each of the composition friction elements 38 and 39 is positioned to engage corresponding metallic friction elements 26 and 21 on the portions which are unsupported directly by the structure of the piston, and which are subjected to the action of the cooling liquid in the annular piston chamber 20, and that the engaging areas of the elements 38 and 39 are substantially the same as the unsupported areas of the metal friction elements 26 and 21.

Thus, it will be seen that when the cooling liquid under pressure is supplied to the annular piston chamber 20, this pressure will act on the unsupported areas of the inner and outer metallic friction rings 26 and 21, and that substantially the same pressure in the chamber 29 will act on the piston 17 to force the metallic friction elements into engagement with the composition friction elements 38 and 39 on the wheel. In view of the fact that the copper or metallic friction elements are unsupported on their left sides except by the pressure of the liquid in the annular chamber 20, it will be evident that the force per square inch acting on the left surfaces of the metallic friction elements will be the pressure per square inch of the liquid in the chamber 20. In order that the forces acting on both sides of the metallic friction elements in line with their unsupported areas may be substantially balanced, the area of the annular piston is so chosen as to be equal substantially to the sum of the areas of the unsupported portions of the metallic friction elements 26 and 21. In this manner, the total force acting to the right to force the metallic friction elements against the composition friction rings 38 and 39, will be substantially the same as the fluid pressure force acting on the unsupported areas of the metallic friction rings 26 and 21, and any tendency for the metallic friction elements to distort due to an unbalance of forces acting on their unsupported areas will be overcome. Adequate circulation of cooling liquid is provided adjacent the left surfaces of both the metallic friction elements due to the ports 28 formed in the annular partition portion 24 of the piston.

The present invention is of particular importance in connection with brakes of either the disc or the drum type wherein a large area is required, and the width of the metallic friction elements is quite large. Under such circumstances, the metallic friction elements tend to expand when heated, and if they are quite wide, this expansion is sufficient to cause undue distortion of the elements resulting in bulging or cupping of the elements in their unsupported portions. By utilizing a plurality of elements of smaller width as shown in the accompanying drawing, this difficulty is greatly minimized. In this connection, it is to be noted that the clamping ring 23 is so constituted as to clamp the outer peripheral face portion of the friction element 26 and the inner peripheral face portion of the metallic friction element 21 in such a manner as to permit linear or radial expansion of the elements without actually engaging either the inner or outer surface of the leg of the T shaped clamping ring 23, a clearance being provided between the leg of the T of the clamping ring and the outer periphery of the metallic friction element 26 and between the leg of the T and the inner periphery of the metallic friction ring 21.

Although the invention has been shown and described as incorporated in a particular type of brake mechanism, it will be readily understood that the same principles may be applied to other forms of brake mechanism, and that the invention is not to be considered as limited to the specific mechanism shown.

In Fig. 1, means are shown for controlling the flow of cooling liquid through the brake actuator 6, as well as means under the control of the operator for controlling the pressure of the liquid in the brake actuator. Such means comprises a brake valve mechanism 8 which includes a casing 40 having a bore 41 and a spool valve 42 slidably mounted therein and connected with a brake pedal 43 by means of a brake rod 44 and a link 45. The brake valve is provided with an inlet port 46, an outlet port 47, a brake supply port 48 and a brake return port 49. In addition to the above, the brake valve is also provided with an atmospheric vent port 50 which is connected by a conduit 51 to upper tank 51a of the engine radiator 7, the tank being connected to atmosphere by an over flow line 52. The spool valve is provided with a tapered valve portion 53 at its right and adapted to enter and restrict the open end of a bore 54 formed in a plug 55 secured to the right end of the brake valve casing and containing the brake return port 49. A bore 56 extends through the spool valve as shown, and is connected with the bore 41 by means of ports 57 in the wall of the bore 56. A groove 58 on the spool valve serves, with the valve in the position shown, to connect ports 46 and 47, and land 59 on the valve serves to normally close port 48 while permitting communication between the bore 41 and the atmospheric vent port 50.

With the parts in the position shown, and with the engine running, the circulating pump 4, which is preferably of the positive displacement type and may be driven by the vehicle engine as shown or by other suitable means, draws water from the bottom of the radiator 7 through a conduit 60 and pumps it back to the radiator through a conduit 61, valve port 46, valve groove 58, outlet port 47, a conduit 62, engine 5, and a conduit 63, it thus being apparent that the brake actuator 6 is entirely cut off from the circulating portion of the system during this condition of operation. At the same time, in the event of any leakage of liquid from the spool valve channel 58 into the bore 41, which would tend to increase the pressure of the liquid in the brake actuator and cause the brakes to drag, such leakage is relieved by way of port 50, conduit 51, radiator 7, and tank 51a.

In the event it is desired to apply the brake, the brake pedal 43 is depressed to move the spool valve to the right, whereupon vent port 50 is closed and the connection between inlet and outlet ports 46 and 47 is restricted, while at the same time, the brake supply port 48 is opened and some of the liquid circulated by the pump is transmitted to the brake actuator through a conduit 64 and inlet conduit 15, and is transmitted back to the radiator through outlet conduit 16 of the actuator, a conduit 65, brake return port 49 in the control valve, bore 54 of the plug 55, bore 41 of the valve casing, port 57 and bore 56 in the spool valve, and thence to the vehicle radiator through outlet port 47, conduit 62, engine 5, and conduit 63. As soon as the brake pedal is moved sufficiently, the outlet port 47 will be fully closed, and the entire output of the pump 4 will be circulated through the brake actuator as above described. As the spool valve is moved to the right, the restricting valve 53 will eventually restrict the opening at the left end of the bore 54, and in the event a pump of the positive displacement type is utilized, this restriction to the return flow of cooling liquid from the brake actuator will cause an increase in pressure in the actuator sufficient to move the piston and metallic friction elements therein to effect engagement of the latter with the composition friction rings 38 and 39 to effect a brake application, the magnitude of which is controlled by the degree of restriction of the bore 54. Except for a slight increase in the slip or leakage of the pump at increasing pressures, this action will be accomplished without materially changing the rate of flow of liquid through the brake actuator, and consequently the latter will be adequately cooled regardless of the degree of pressure of the liquid therein. By properly positioning the valve 53 in relation to the bore 54, the pressure of liquid in the brake actuator can be graduated to suit the operator's requirements.

On release of the brake pedal, the port 48 will again be disconnected from the actuator, the actuator will be connected to atmosphere by way of the vent port 50, and the inlet and outlet ports 46 and 47 will again be connected to permit circulation of the liquid through the vehicle engine and radiator only, in the normal manner. By properly positioning the groove 58 in the spool valve with relation to the ports 46, 47 and 48, the valve mechanism can be so arranged as to insure an adequate flow of cooling liquid through the brake actuator before the bore 54 is sufficiently restricted by the valve 53 to cause any appreciable brake application which might tend to overheat the brake in the event the full capacity of the pump 4 were not available to circulate cooling liquid therethrough. It will be readily understood by those skilled in the art that the valve may be so arranged as to supply the necessary amount of cooling liquid to the brake actuator for any given degree of brake application depending on the requirements of the particular design involved.

Referring now to Fig. 3, it may in some cases be desirable to so arrange the mechanism that the metallic friction elements are free to expand radially both outwardly and inwardly on the piston, and to this end, the friction elements 21 and 26 are not only clamped to the partition 24 by the clamping ring 23, but in addition the ring 21 is clamped at its outer periphery to the piston by means of a clamping ring 66 held in position by screws 67, while the inner periphery of the friction element 26 is clamped against the end of the piston by clamping ring 68 held in position by screws 69. The clamping rings 66 and 68 are so constructed and dimensioned that the outer periphery of the element 21 and the inner periphery of the element 26 do not engage the corresponding clamping rings in such a manner as to prevent radial expansion of the elements inwardly or outwardly. With this arrangement, the torque during a brake application is transmitted to the pistons from the friction elements due to their frictional engagement with both the piston and the clamping rings 66 and 68, thus resulting in a structure wherein it is possible for a certain amount of radial expansion and contraction to take place both outwardly and inwardly between each of the friction elements and the piston. It will be noted, that aside from the use of the clamping rings 66 and 68 to hold the rings in place at the inner and outer peripheries of the piston, the construction of the piston and the arrangement of the friction elements and the central clamping ring 23 is substantially identical to that shown in Fig. 2.

As indicated heretofore, the utilization of a plurality of relatively narrow adjacent metallic friction elements, such as the elements 21 and 26, tends to materially reduce distortion of these elements due to thermal effects, and by clamping the elements with the clamping ring 23 in such a manner as to permit limited expansion of the elements without engagement of the peripheries thereof with the clamping ring, serves to further minimize the chance of buckling of the metallic elements either outwardly or inwardly under the influence of heat.

Since the metallic friction elements are preferably of a thin metal, such as copper, it is necessary that they be properly supported in order to withstand the braking forces exerted due to engagement of the metal elements with the surfaces of the corresponding composition friction elements 39 and 38 on the wheel. In order to properly cool the metallic friction elements, it is necessary that substantially the entire rear surfaces of the elements opposite the surfaces directly contacting the composition friction elements be subjected directly to the action of the circulating cooling liquid, and consequently the area of the piston which moves the elements into engagement with the composition friction rings is so chosen as to insure that the force acting on the unsupported rear surfaces of the metallic friction elements due to the pressure of the cooling liquid to which they are subjected is substantially equal to the force exerted on the friction elements in the opposite direction due to engagement of the composition friction rings with the metallic elements.

This desirable end is readily accomplished by so choosing the piston area as to have it substantially correspond to the sum of the unsupported areas of the metallic friction elements 21 and 26 which are supported only by fluid pressure. In addition to the foregoing, the composition friction rings 39 and 38 are so positioned relative to the metallic friction elements 21 and 26 as to be in alignment with the unsupported portions of the metallic friction elements. Consequently, the heat is generated on the right side of the metallic friction elements by engagement with the composition friction rings, is transmitted directly through the metalic elements in a direction normal to their engaging surfaces, and is removed from the brake mechanism by the circulating liquid which engages the surfaces of the metallic friction elements directly opposite to and in alignment with their engaging frictional surfaces. In the event the invention is utilized in connection with other types of brakes such as shoe brakes of the internal type operating in conventional type brake drums, the areas of the actuating pistons or pressure responsive members for the shoes will be so chosen as to substantially correspond to the sum of the unsupported areas of the metallic friction elements on the brake shoes actuated thereby.

While the invention has been illustrated and described in considerable detail, it is to be understood that the same is not to be considered as limited thereby, and that other embodiments of the invention may suggest themselves to those skilled in the art within the scope of the present invention. Reference will be had, therefore, to the appended claims for a definition of the limits of the invention.

What is claimed is:

1. Liquid cooled and liquid presure operated frictional mechanism including a support having a member rotatably mounted thereon provided with a plurality of adjacent composition friction elements secured thereto, and an actuator secured to the support, inlet and outlet ports for supplying cooling liquid to the actuator and discharging liquid therefrom, a movable brake shoe member in the actuator responsive to the pressure of liquid therein, and a plurality of thin metallic friction elements secured to said pressure responsive member, said elements being so secured to said pressure responsive member as to provide unsupported areas exposed to said cooling liquid in the actuator and to the pressure of said liquid and positioned for engagement with the corresponding composition friction elements on areas substantially equal to said unsupported areas and substantially in alignment therewith, the effective area of said member responsive to the pressure of liquid in said actuator being substantially equal to the sum of the unsupported areas of said metallic friction elements exposed to the action of the liquid in said actuator.

2. Liquid cooled and liquid pressure operated frictional mechanism as set forth in claim 1, wherein clamping means are provided for securing said metallic friction elements to said brake shoe member, said clamping means being so constituted as to engage the outer surface only of said elements and to permit limited linear thermal expansion and contraction thereof with respect to said brake shoe member.

3. Liquid cooled and liquid pressure operated frictional mechanism as set forth in claim 1, wherein said composition friction elements are spaced annular rings concentric with the axis of rotation of the wheel, and said metallic friction elements are spaced apart concentric annular rings, said unsupported areas of said elements being in alignment with and of substantially the same area as the engaging portions of the corresponding annular composition friction rings.

4. Liquid cooled and liquid pressure operated frictional mechanism as set forth in claim 1, wherein said adjacent composition friction elements are annular rings, said metallic friction elements are annular rings having unsupported areas corresponding substantially to the areas of the composition friction elements adjacent thereto and in alignment therewith, and the inner and outer peripheries of said metallic friction elements are held against the end of said brake shoe member by clamping rings, said clamping rings being so constituted as to engage only the outer faces of said metallic friction rings and to permit limited thermal expansion and contraction of said rings in a plane perpendicular to the axis of said wheel.

5. Liquid cooled and liquid pressure operated frictional mechanism as set forth in claim 1, wherein said composition friction elements are annular rings secured to the wheel and concentric with the axis thereof, said metallic friction elements are annular concentric rings having their peripheral portions supported by said brake shoe and having annular unsupported areas exposed to the liquid in the actuator of substantially the same area as the corresponding composition friction elements and substantially in alignment therewith, and which includes positive torque transmitting means for securing one peripheral portion of each of said metallic friction elements to said brake shoe member, and clamping means engageable with the faces of the other peripheral portions of said metallic friction elements for securing them to said brake shoe member in sealing engagement therewith, said clamping means being so constituted as to permit limited linear and radial thermal expansion and contraction of said metallic friction rings relative to said brake shoe member and clamping means.

6. Liquid cooled and liquid pressure operated frictional mechanism including a support having a member rotatably mounted thereon provided with a plurality of adjacent annular composition friction elements secured thereto, and an actuator secured to the support having inlet and outlet ports for supplying cooling liquid to the actuator and discharging liquid therefrom, a movable annular brake shoe member in the actuator responsive to the pressure of liquid therein, an open ended annular liquid channel in said shoe member having an annular partition concentric with and spaced from the inner and outer walls of the chamber and provided with liquid ports therethrough, a pair of metallic friction rings secured to said shoe member and closing the open end thereof, the outer periphery of the outer ring being secured to the outer periphery of said shoe member, the inner periphery of the inner metallic ring being secured to the inner periphery of the shoe member, and the outer periphery of the inner metallic ring and the inner periphery of the outer metallic ring being secured to said partition, and connections between said annular channel in said shoe member and said inlet and outlet ports, the unsupported areas of the metallic friction rings being substantially the same as the areas of the adjacent corresponding compositon friction elements and in alignment therewith, and the area of the pressure responsive brake shoe member subjected to the pressure of liquid in the actuator being substantially equal to the sum of the unsupported areas of said metallic friction rings.

7. A brake shoe for a liquid-cooled friction brake including a piston having an open ended annular channel at one end thereof, inlet and outlet ports in the piston for supplying a cooling liquid thereto and discharging cooling liquid therefrom, an annular partition in the piston intermediate the inner and outer walls of said annular channel and concentric therewith, a pair of adjacent annular metallic friction elements secured to the end of said piston and closing the open end of said channel, the adjacent peripheral portions of said annular friction elements being secured to said partition, and radial ports extending through said annular partition, whereby the liquid supplied to said piston channel by said inlet port is circulated through said channel on both sides of said partition.

8. A brake shoe for a liquid-cooled brake as set forth in claim 7, wherein said adjacent peripheral portions of said friction elements are secured to said partition by a common annular clamping ring.

9. A brake shoe for a liquid-cooled brake mechanism as set forth in claim 7, wherein the effective area of said piston is substantially equal to the sum of the areas of said metallic friction elements which are unsupported directly by said piston.

10. A brake shoe for a liquid-cooled friction brake including a piston having an open ended annular channel at one end thereof, inlet and outlet ports in the piston for supplying a cooling liquid thereto and discharging a cooling liquid therefrom, annular partition means in the piston intermediate the radially inner and outer walls of said channel concentric therewith and dividing said channel into a plurality of concentric annular cooling liquid passages, a pluralty of adjacent annular and concentric metallic friction elements secured to the end of the piston and closing the open end of said channel, the adjacent peripheral portions of the annular friction elements being secured to said partition means, and radial ports extending through said partition means, whereby the liquid supplied to said channel by said inlet port is circulated through said passages.

11. A brake shoe for a liquid-cooled friction brake including an annular shoe member having an open ended annular channel at one end thereof, an annular partition in the channel intermediate the radially inner and outer walls of said channel and concentric therewith, a pair of adjacent annular metal friction elements secured to said one end of the member and closing the open end of said channel, the adjacent peripheral portions of said elements being secured to said partition, inlet and outlet ports in said member, and means for connecting said ports with said channel on both sides of said partition.

References Cited in the file of this patent
UNITED STATES PATENTS

| | | |
|---|---|---|
| 464,949 | Alden | Dec. 15, 1891 |
| 2,351,180 | Ash | June 13, 1944 |
| 2,664,176 | Whalen | Dec. 29, 1953 |